United States Patent Office 3,346,340
Patented Oct. 10, 1967

3,346,340
PRODUCTION OF BROMINE BY OXIDATION OF HYDROGEN BROMIDE
Cecelia J. Louvar, Evanston, and Armand J. de Rosset, Clarendon Hills, Ill., assignors to Universal Oil Products Company, Des Plaines, Ill., a corporation of Delaware
No Drawing. Filed Aug. 11, 1966, Ser. No. 571,708
7 Claims. (Cl. 23—216)

ABSTRACT OF THE DISCLOSURE

Oxidation of hydrogen bromide to elemental bromine in contact with copper oxide or cerium oxide supported on zirconia, alpha-alumina or theta-alumina.

This application is a continuation-in-part of our copending application Ser. No. 344,543, filed Feb. 13, 1964 and now abandoned.

This invention relates to a process for the oxidation of hydrogen bromide and particularly to a process for the oxidation of hydrogen bromide in the presence of novel catalytic compositions of matter, the exact composition of which is hereinafter set forth in greater detail, whereby substantially quantitative yields of bromine are recovered.

Olefinic hydrocarbons which are useful as intermediates in many organic reactions or as starting materials for the preparation of useful compositions of matter, a specific example of which is the use of butadiene in the preparation of synthetic rubber, are prepared from more saturated hydrocarbons by halogenation of said saturated hydrocarbon and subsequent dehydrohalogenation of the resultant halohydrocarbon. This halogenation step is effected by a direct halogenation of the more saturated hydrocarbon with elemental halogen. Following this, the dehydrohalogenation is usually effected by heating the resultant halohydrocarbon at decomposition temperatures thus forming a dehydrohalogenation reaction mixture comprising the olefinic hydrocarbon product and hydrogen halide. This method of preparing the desired olefinic hydrocarbons is economically attractive provided that the resulting hydrogen halide which has been formed in the dehydrohalogenation step can be efficiently separated from the dehydrohalogenation mixture, and further provided that substantially all of the halogen can be regenerated from the hydrogen halide and recovered as elemental halogen for reuse in the first mentioned halogenation step.

It is therefore an object of this invention to provide a process for the substantially quantitative recovery of bromine from hydrogen bromide.

A further object of this invention is to provide an improved process for the oxidation of a hydrogen halide, and particularly hydrogen bromide in the presence of certain catalytic compositions of matter whereby substantially the entire amount of the elemental halogen, and particularly bromine, may be recovered for reuse in other processes.

In one aspect, an embodiment of this invention resides in a process for the substantially quantitative recovery of bromine from hydrogen bromide which comprises treating said hydrogen bromide at oxidation conditions with an oxygen-containing gas in the presence of a catalytic-inert support composite, said composite comprising an oxide of a metal selected from the group consisting of copper and cerium composited on an inert metal oxide support having a surface area of from about 5 to about 100 square meters per gram and containing less than about 50 micromoles of hydroxyl per gram, and recovering the resultant bromine.

A specific embodiment of this invention is found in a process for the substantially quantitative recovery of bromine from hydrogen bromide which comprises treating the hydrogen bromide at a temperature in the range of from about 300° to about 600° C. with an oxygen-containing gas comprising air in the presence of a catalytic-inert support composite comprising from about 2% to about 50% by weight of copper oxide composited on α-alumina, said α-alumina having a surface area of from about 5 to 100 square meters per gram and containing less than about 50 micromoles of hydroxyl per gram, and recovering the resultant bromine.

Other objects and embodiments will be found in the following further detailed description of this invention.

As hereinbefore set forth, the present invention is concerned with a process for the oxidation of hydrogen halide and particularly hydrogen bromide, whereby substantially quantitative yields of the elemental halide, and again particularly bromide, is recovered for reuse in other processes. Heretofore, the prior art has disclosed a process for the recovery of bromine utilizing a catalyst comprising cupric chloride composited on a ceramic material such as broken bricks, clay tiles or other ceramic materials. Other prior art processes disclosed the use of copper salts or oxides or salts of other metals such as nickel, cobalt, manganese, etc. deposited on pumice, quartz or other ceramic material will be used to make bromine by oxidizing hydrogen bromide. However, this process will only result in obtaining about 97% of the bromine. It is necessary when recovering bromine that the recovery be substantially quantitative in nature inasmuch as a loss of bromine as hydrogen bromide will necessitate a recycle thereby rendering the process economically unattractive to operate.

In contradistinction to these prior art processes, it has now been discovered that certain inert metal oxide supports which possess certain physical characteristics may be impregnated with a copper or cerium-containing compound to prepare a catalyst which will enable the process of recovering bromine by the oxidation of hydrogen bromide to be effected in such a manner whereby substantially quantitative yields of bromine, that is, yields greater than 99.7% + be obtained. These particular inert metal oxide supports will be hereinafter set forth in greater detail.

The hydrogen halide which forms the feed stock for the oxidation reaction results from the dehydrohalogenation of a halogenated hydrocarbon such as ethyl bromide, propyl bromide, butyl bromide and higher homologs thereof containing up to about 20 carbon atoms as well as the various position and structural isomers thereof including 2-bromobutane, 3-bromopentane, 2-bromo-2-methylbutane, 2-bromo-2,4-dimethylpentane, etc.; alkyl dibromides including 2,3-dibromobutane, 2,3-dibromo-2-methylbutane, 3,4-dibromo-3-methylhexane, etc.; cycloalkyl bromides including cyclobutyl bromide, cyclopentyl bromide, cyclohexyl bromide, etc. The dehydrobromination of these brominated hydrocarbons is usually effected at temperatures of from about 50° to about 550° C., a temperature in the lower range of from about 50° to about 450° C. being suitable in the treatment of monobromides, and a temperature in the higher range of from about 200° to about 500° C. being suitably employed in the treatment of dibromides.

One method of recovering the elemental bromine which has heretofore been employed is to pass the hydrogen bromide over a composition of matter which comprises a catalytic element composited on an adsorbent support. The hydrogen bromide upon passage over this composite is sorbed thereon following which the adsorbed hydrogen bromide is contacted with oxygen or an oxygen-containing gas such as air at conditions which effect the oxidation of combined bromine. However, this is, in effect, a two-step operation, the steps comprising (1) passing the hydrogen bromide per se or in combination with the olefinic hydrocarbon over this catalyst-adsorbent composite and (2) thereafter passing the oxygen or oxygen-containing gas over the catalyst-adsorbent composite containing the adsorbed hydrogen bromide.

By utilizing the novel catalytic compositions of matter hereinafter contemplated in greater detail, it is possible to recover elemental bromine in quantitative yields by treating hydrogen bromide with oxygen or an oxygen-containing gas such as air while simultaneously passing both the hydrogen bromide and the oxygen-containing gas over the catalyst at temperature conditions that effect the direct oxidation of the combined bromine and as hereinbefore set forth, permit the recovery of substantially quantitative yields of elemental bromine. As previously disclosed, the recovery of elemental bromine in substantially quantitative yields constitutes a great importance from an economic standpoint when contemplating a process of preparing unsaturated hydrocarbons, both mono- and polyolefinic in nature, so that the desired process will result in an operation which is economically feasible and attractive to the prospective user thereof, inasmuch as a recycle apparatus will not be required in order to recover all of the elemental bromine.

The catalytic compositions of matter which are utilized to effect the process of the present invention, that is, the direct oxidation of hydrogen bromide to form elemental bromine comprise a composite of a metal selected from the group consisting of copper and cerium, said oxide being composited on an inert metal oxide support. The preferred inert metal oxide support will be that which contains a surface area within the range of from about 5 to about 100 square meters per gram. Normally speaking, high surface area supports such as those containing surface areas within the aforementioned range will contain residual hydroxyl groups. These hydroxyl groups constitute a deactivating influence and have an adverse effect on the present process, inasmuch as said hydroxyl group will react with the hydrogen bromide to give metallic bromides which are volatile in nature. If this reaction occurs, the catalyst will become unstable and will allow the deposition of metallic bromides downstream in the system thereby building up deposits and causing plugging of the system. It is therefore a necessity for the inert metal oxide support to contain a relatively small amount of residual hydroxyl groups in order to obtain a catalyst which will permit the substantially quantitative recovery of bromine without the formation of metallic bromides. In addition, products which contain more than about 100 square meters per gram are not preferred inasmuch as said products tend to absorb the hydrogen bromide when said hydrogen bromide is passed over the catalytic composition of matter and thus will not permit the total oxidation of the hydrogen bromide to form elemental bromine and thus permit the recovery of substantially quantitative yields of elemental bromine. It has now been found that inert supports such as zirconia, α-alumina and θ-alumina possess the aforementioned desired physical properties of necessary surface area and hydroxyl content and may be utilized as carriers for the aforementioned oxides of copper or cerium.

The process of this invention is preferably effected in a continuous type of operation although it is also contemplated within the scope hereof that the process may be effected in a batch type operation, although not necessarily with equivalent results. When a continuous type of operation is used, a reactor containing a catalytic composition of matter of the type hereinbefore set forth in greater detail which contains less than about 50 micromoles of hydroxyl per gram and which has a surface area of from about 5 to about 100 square meters per gram is maintained at the proper operating conditions of temperature and pressure, said conditions including a temperature in the range of from about 300° to about 600° C. and a pressure which is approximately atmospheric in nature. The hydrogen halide, and preferably hydrogen bromide, along with an oxygen-containing gas such as air is passed through the catalyst bed at a combined gaseous hourly space velocity within the range of from about 700 to about 1500 and preferably at about 1000. After passage through the catalyst bed, the effluent will contain only unreacted oxygen-containing gas.

The following examples are given to illustrate the process of the present invention which, however, are not intended to limit the generally broad scope of the present invention in strict accordance therewith.

Example I

A catalyst composition was prepared by dissolving 488 g. of zirconyloxychloride (38% zirconia) in 500 cc. of water. In addition, 447 g. of cupric nitrate was dissolved in 400 cc. of water and mixed with the aqueous solution of zirconyloxychloride. The resulting solution was then poured slowly with vigorous stirring into 2600 cc. of 3 N sodium hydroxide. The resulting precipitate was filtered; the filter cake was reslurried, washed and filtered 7 times with 2 liters of water containing 30 cc. of 6 N sodium hydroxide. Intermittent chloride tests were made with silver nitrate. The filter cake was washed for the 8th time with 6 liters of water which contained no sodium hydroxide. The filter cake was then dried for a period of about 16 hours in an oven at a temperature in the range of from about 120° C. to about 150° C. following which the composite was pilled and calcined for a period of 2 hours at 600° C. The finished catalyst contained 44% copper oxide.

Example II

In this example, 34 g. of cupric nitrate were dissolved in 75 cc. of water and poured over 100 cc. (55.6 g.) of 1/16 inch θ-alumina spheres, said spheres having been calcined at a temperature of about 1050° C. for a period of 3 hours. The resulting catalyst composite was dried in a rotating evaporator and calcined for 2 hours at 600° C. The impregnation was repeated using 79 g. of cupric nitrate dissolved in 75 cc. of water. The spheres were again dried in a rotating evaporator and calcined for 2 hours at 600° C. The finished catalyst contained 39% copper oxide.

Example III

In this example, 1800 g. of zirconyloxychloride was dissolved in 2 liters of water. Following this, 246 g. of cerium sulfate was dissolved in two liters of 0.5 N sulfuric acid. The two solutions were mixed and quickly poured into 2380 cc. of 14% ammonium hydroxide. After filtering through a vacuum funnel the filter cake was charged to a wash tower and washed with hot water containing .035% ammonium nitrate at the rate of 1 cubic foot per hour for 17 hours. The washed catalyst was oven dried for 20 hours at a temperature of 120° C. and ground to a size of 10–30 mesh. The granules were then calcined for a period of two hours at 600° C. The finished catalyst contained 9% cerium oxide on the zirconia support.

Example IV

Another catalyst containing 3% copper oxide on zirconia was prepared by dissolving 68 g. of cupric nitrate in 100 cc. of water and 1801 g. of zirconyloxychloride in 2000 cc. of water. The solutions were mixed together and poured slowly, while stirring, into 7200 cc. of 3 N sodium hydroxide. The precipitate was filtered as dry as possible in a vacuum funnel and thereafter charged to a wash tower. The precipitate was washed with hot water at a rate of 8 gallons per hour and 3 N sodium hydroxide at a rate of 300 cc. per hour for a period of 20 hours. The washed catalyst was then dried for approximately 70 hours at 120° C. and thereafter calcined for 2 hours at 600° C. Following this, the catalyst was ground to a 10–30 mesh.

Example V

To illustrate the necessity for a substantially inert support of the type hereinbefore set forth in greater detail, another catalyst was prepared. A solution of 265 g. of cupric nitrate dissolved in 150 cc. of water was poured over 88 g. (200 cc.) of pumice. The catalyst was dried in a rotating evaporator and thereafter calcined for 2 hours at a temperature in the range of from about 650° to about 700° C. Excess cupric nitrate was sieved out on a 14-mesh screen, the final catalyst comprising 15% copper oxide on the pumice was about 8–14 mesh.

Example VI

The catalysts which were prepared according to Examples I, II and V above were tested for the direct oxidation of hydrogen bromide. The catalyst in each case comprised 25 cc. and was placed in a glass reactor mounted in a vertical swing furnace. The catalyst loading in the reactor was preceded by 50 cc. of quartz chips. Hydrogen bromide and air in a mixture containing about 20% stoichiometric excess of oxygen were passed upflow over the catalyst at a combined space velocity of 1000. The temperatures which were recorded at the middle of the catalyst bed and at the top of the quartz chips section were varied from 300° to about 450° C. The effluent consisting of bromine, hydrogen bromide, if any, and water passed through heated glass tubing and then into a wet ice trap. Any bromine or hydrogen bromide which passed through the wet ice trap was then passed into a Dry Ice trap and thereafter into a caustic scrubber. The effluent was then passed through a gas sampling tube and at the end of the run was collected and analyzed by means of a mass spectrometer. The results are set forth in Table I below in which catalyst A comprised 44% copper oxide on zirconia, catalyst B comprised 39% copper oxide on θ-alumina, and catalyst C comprised 15% copper oxide on pumice.

TABLE I

| | Catalyst | | | | | | | |
|---|---|---|---|---|---|---|---|---|
| | A | | B | | | C | | |
| Temperature, ° C | 403–406 | 455–456 | 404–405 | 454–455 | 353–354 | 340–400 | 390–490 | 407–408 |
| Pressure | (*) | (*) | (*) | (*) | (*) | (*) | (*) | (*) |
| HBr GHSV | 393 | 399 | 393 | 396 | 396 | 205 | 404 | 400 |
| Air GHSV | 590 | 590 | 590 | 590 | 590 | 304 | 590 | 607 |
| Conversion percent (Bromine) | 99.79 | 99.86 | 99.71 | 99.70 | 99.86 | 77.40 | 74.90 | 58.90 |

*1 atmosphere.

In addition to the above experiments, another bromine experiment was performed in which hydrogen bromide and air were passed over a catalyst consisting of only copper oxide wire without an inert support under conditions similar to that set forth in Table I above, that is, a temperature ranging from 150° to 370° C. and hydrogen bromide and air mixture at a rate of 200 GHSV and 300 GHSV, respectively, giving a 20% stoichiometric excess of oxygen. This rate was carried out for 50 minutes following which the air rate was doubled to 600 GHSV for an additional 16 minutes. At the end of this time, the total conversion of hydrogen bromide to elemental bromine was only 0.46%.

Example VII

In this example, the catalysts prepared according to Examples III and IV above were used for the oxidation of hydrogen bromide to elemental bromine in a continuous manner for a period of time ranging up to 273 hours. The reaction zone comprised a stainless steel catalytic reactor and preheater coil in which the catalyst was held between two steel plates, said plates being welded apart using a peripheral separator whereby each catalyst particle was placed within a short distance of two heat transfer surfaces, thereby minimizing temperature rise. The reactor effluent was similar to that hereinabove described in Example VI and comprised a wet ice trap, a Dry Ice trap and caustic scrubber. The results of these experiments are set forth in Table II below in which the catalyst designated as E comprised 3% copper oxide on zirconia and catalyst F comprised 9% cerium oxide on zirconia.

TABLE II

| CATALYST E | | | | | | |
|---|---|---|---|---|---|---|
| Hours on Stream | 4 | 17 | 56 | 80 | 104 | 132 |
| Max. Cat. Temp. ° C | 400 | 398 | 403 | 414 | 413 | 416 |
| GHSV (total) | 1,000 | 1,000 | 1,000 | 1,000 | 1,000 | 1,000 |
| Air/HBr Ratio | 3/2 | 3/2 | 3/2 | 3/2 | 3/2 | 3/2 |
| Percent Conversion of Bromine | 99.94 | 99.97 | 99.97 | 99.98 | 99.98 | 99.97 |

| CATALYST F | | | | | | | |
|---|---|---|---|---|---|---|---|
| Hours on Stream | 17 | 35 | 113 | 165 | 204 | 230 | 273 |
| Max. Cat. Temp. ° C | 413 | 455 | 453 | 435 | 455 | 419 | 421 |
| GHSV (total) | 1,000 | 1,000 | 1,000 | 1,000 | 1,000 | 1,000 | 1,000 |
| Air/HBr Ratio | 3/2 | 3/2 | 3/2 | 3/2 | 3/2 | 3/2 | 3/2 |
| Percent Conversion of Bromine | 91.30 | 99.52 | 99.76 | 99.93 | 99.96 | 99.73 | 99.06 |

Example VIII

Yet another catalyst was prepared by dissolving 1056 g. of zirconyloxychloride in 1200 cc. of water. Following this 512 g. of cupric nitrate was dissolved in 500 cc. of water and added to the zirconyloxychloride solution. The entire salt solution was slowly poured while continuously stirring into five liters of 3 N sodium hydroxide. The resulting precipitate was reslurried six times with water containing sodium hydroxide. After six reslurries the chloride test was negative. The precipitate was oven dried for 24 hours at 120° C. and thereafter calcined for two hours at 600° C. The finished catalyst comprised 29% copper oxide on zirconia.

This catalyst was used in the oxidation of hydrogen bromide in a manner similar to that set forth in Example VII above utilizing similar equipment. The results of this experiment are set forth in Table III below.

TABLE III

| Hours on Stream | 18 | 54 | 80 | 98 | 116 | 135 | 178 | 223 | 245 |
|---|---|---|---|---|---|---|---|---|---|
| Max. Cat. Temp. ° C | 441 | 419 | 440 | 414 | 492 | 393 | 457 | 396 | 392 |
| GHSV (total) | 1,000 | 1,000 | 1,000 | 1,000 | 1,000 | 1,000 | 1,000 | 1,000 | 1,000 |
| Air/HBr Ratio | 3/2 | 3/2 | 3/2 | 3/2 | 3/2 | 3/2 | 3/2 | 3/2 | 3/2 |
| Percent Conversion of Bromine | 93.00 | 99.94 | 99.98 | 99.99 | 99.99 | 99.99 | 99.54 | 99.76 | 99.91 |

Example IX

A catalyst which is used for the oxidation of hydrogen bromide is prepared by dissolving 34 g. of cupric nitrate in 75 cc. of water and is poured over 100 cc. of α-alumina spheres, said spheres having been previously calcined at a temperature of approximately 1400° C. for a period of two hours. The resulting catalyst composite is then dried in a rotating evaporator and calcined for a period of two hours at 600° C. The impregnation is repeated utilizing 79 g. of cupric nitrate dissolved in 75 cc. of water. The catalyst composite is then dried in a rotating evaporator and calcined for an additional period of two hours at 600° C.

As will be noted from Table III in Example VIII the use of a catalyst composite comprising an oxide of a metal selected from the group consisting of copper and cerium composited on an inert support which has a surface area of from 5 to 100 square meters per gram and which contains less than about 50 micromoles of hydroxyl per gram, said supports include zirconia, α- and θ-alumina for the direct oxidation of hydrogen bromide to elemental bromine will permit the recovery of quantitative yields of elemental bromine. This is in contradistinction to the use of other catalysts, such as copper oxide on pumice, cupric chloride on a ceramic material or copper oxide per se, the results when using these catalysts in the direct oxidation of hydrogen bromide to elemental bromine resulting in the recovery of considerably less than quantitative yields of bromine and therefore will render such a process economically unattractive to operate.

We claim as our invention:

1. A process for the substantially quantitative recovery of bromine from hydrogen bromide which comprises treating said hydrogen bromide at oxidation conditions with an oxygen-containing gas in the presence of a catalytic-inert support composite, said composite comprising an oxide of a metal selected from the group consisting of copper and cerium composited on an inert metal oxide support selected from the group consisting of alpha-alumina and theta-alumina having a surface area of from about 5 to about 100 square meters per gram and containing less than about 50 micromoles of hydroxyl per gram, and recovering the resultant bromine.

2. The process as set forth in claim 1, further characterized in that said oxidative conditions include a temperature in the range of from about 300° to about 600° C.

3. The process as set forth in claim 1, further characterized in that said composite contains from about 2% to about 50% by weight of the metal oxide selected from the group consisting of copper and cerium.

4. The process as set forth in claim 1, further characterized in that said inert metal oxide support comprises α-alumina.

5. The process as set forth in claim 1, further characterized in that said inert metal oxide support comprises θ-alumina.

6. The process as set forth in claim 1, further characterized in that said catalyst composite comprises from about 2% to about 50% by weight of copper oxide composited on α-alumina.

7. The process as set forth in claim 1, further characterized in that said catalyst composite comprises from about 2% to about 50% by weight of copper oxide composited on θ-alumina.

References Cited

UNITED STATES PATENTS

| | | | |
|---|---|---|---|
| 2,163,877 | 6/1939 | Hooker | 23—216 |
| 2,395,314 | 2/1946 | Blumer | 23—219 |
| 2,536,457 | 1/1951 | Mugdan | 23—216 |
| 2,892,686 | 6/1959 | Greene et al. | 23—216 |
| 2,892,687 | 6/1959 | Deahl et al. | 23—216 |
| 2,958,583 | 11/1960 | Hervert et al. | 23—143 |
| 2,965,452 | 12/1960 | Paul | 23—216 |
| 2,968,537 | 1/1961 | Nixon. | |
| 3,071,436 | 1/1963 | Hervert et al. | 23—143 |
| 3,114,607 | 12/1963 | Milliken | 23—215 |
| 3,114,785 | 12/1963 | Hervert et al. | 260—683.2 |
| 3,227,521 | 1/1966 | Carithers et al. | 23—142 |
| 3,273,964 | 9/1966 | De Rosset | 23—216 |

OSCAR R. VERTIZ, *Primary Examiner.*

EDWARD STERN, *Examiner.*